A. C. PATTISON.
KITCHEN UTENSIL.
APPLICATION FILED JULY 17, 1917.
1,290,333.
Patented Jan. 7, 1919.
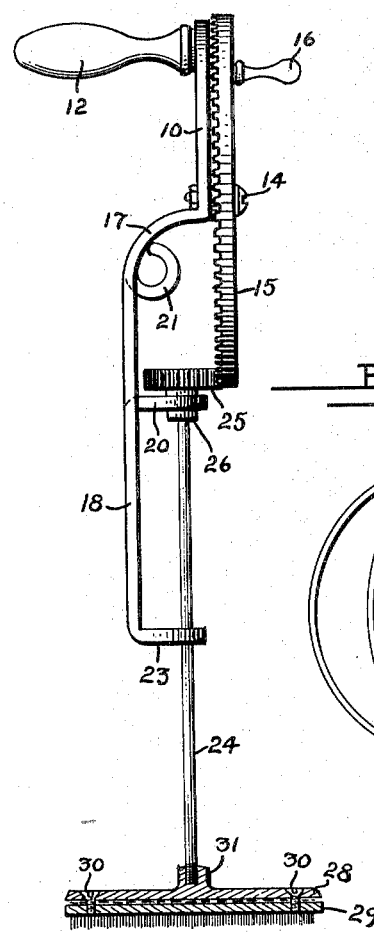
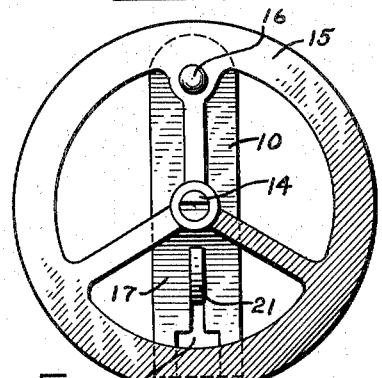
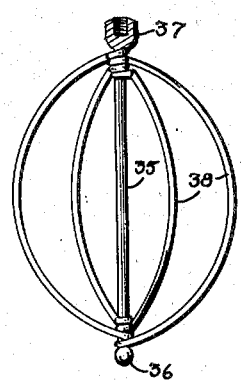
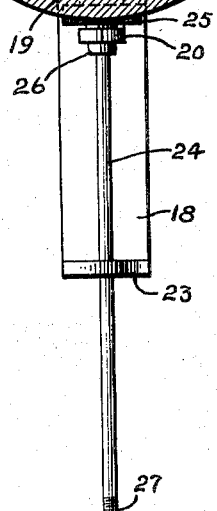
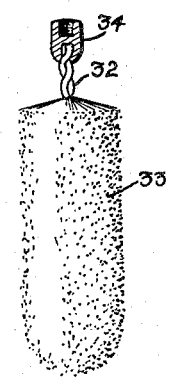
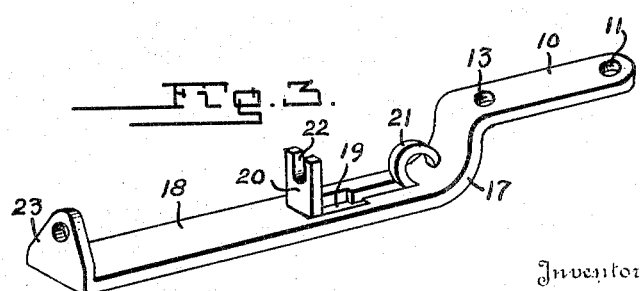
Inventor
Abraham C. Pattison
By Lancaster Allwine
his Attorneys

UNITED STATES PATENT OFFICE.

ABRAHAM C. PATTISON, OF CUMBERLAND, WISCONSIN.

KITCHEN UTENSIL.

1,290,333.  Specification of Letters Patent.  Patented Jan. 7, 1919.

Application filed July 17, 1917. Serial No. 181,113.

*To all whom it may concern:*

Be it known that I, ABRAHAM C. PATTISON, a citizen of the United States, and a resident of Cumberland, in the county of Barron and State of Wisconsin, have invented a certain new and useful Improvement in Kitchen Utensils, of which the following is a specification.

The present invention relates to kitchen utensils, and more particularly to a hand device for cleansing bottles, jars, pans, boilers, for beating eggs, and like uses.

An object of the present invention is to provide a device of this character which is relatively simple in construction; which comprises relatively few parts; which is light in weight; which may be firmly held within a bottle or jar; which is provided with a plurality of tools adapted to be interchangeably mounted upon the movable or rotatable part of the device; and a device which may be economically manufactured.

The above, and various other objects and advantages of this invention will be in part described, and in part understood, from the following brief description of the present preferred embodiment, the same being disclosed in the accompanying drawing wherein:

Figure 1 is a side elevation of a kitchen utensil constructed according to the present invention.

Fig. 2 is a fragmentary side elevation of the upper end of the utensil, taken at right angles to the showing in Fig. 1.

Fig. 3 is a detail perspective view, enlarged, of the frame or body part of the utensil.

Fig. 4 is a detail side elevation of one of the tools for attachment to the shaft of the utensil, the tool being disclosed particularly for use in cleansing bottles.

Fig. 5 is a side elevation of another form of tool adapted to be applied to the shaft of the utensil, this view showing a tool adapted particularly for beating eggs and the like.

Referring to this drawing, the device is provided with a body portion or frame, the frame being preferably made from a single length of strap metal of suitable thickness and width. The strap of metal is provided at its outer or upper end, as shown in Fig. 1, with a flat plate portion 10 comprising one end of the metallic strap, and which is provided upon its upper extremity with an aperture 11 adapted to receive therein one end of a handle 12. The handle 12 projects laterally from the upper end of the frame and is adapted to be grasped in the hand for supporting the device when used as an egg beater or the like. The lower end of the plate portion 10 is provided with an opening 13 adapted to receive a pivot bolt 14 therethrough, the bolt supporting a main drive gear 15 of the crown type, and which has the teeth thereof facing inwardly toward the frame. The drive gear 15 is provided with a handle 16 mounted eccentrically thereon, and preferably adjacent to the peripheral portion of the gear 15, and which is adapted to be grasped in the opposite hand for turning the gear.

The strap forming the frame or body part of the utensil is offset laterally beneath the handle 12 from a point immediately below the opening 13, the strap being preferably curved or arched downwardly as at 17 and merging into a straight arm portion 18 which is of considerable length as compared with the plate portion 10. The arm portion 18 of the strap is stamped to form a slot 19 therein immediately below the arched portion 17. At opposite ends of the slot 19 the arm 18 is provided with outturned tongues 20 and 21 which comprise the material stamped from the strap to form the slot 19. The tongue 21 is relatively narrow and is taken not only from the slot 19, but also from the adjacent end portion of the tongue 20 and is relatively long. The tongue 21 is rolled over the inner side of the arched portion 17 to form a loop therein adapted for the reception of the thumb or finger to anchor the frame in the upper portion or neck of a bottle or jar.

The opposite tongue 20 projects outwardly from the arm 18 beneath the lip 21 at substantially right angles to the strip and has a notch or recess 22 in its outer end formed by the standing out of the end portion of the tongue 21 therefrom. The lower end of the arm 18 is turned inwardly beneath the tongue 20 to form a bearing 23 in the form of a lug, the lug being apertured for the reception of a shaft 24 therethrough which extends longitudinally of the arm 18. The upper or outer end of the shaft 24 has a spur pinion 25 mounted thereon, the hub 26 thereof fitting the recess 22, and the free end portions of the tongue 20 are turned inwardly toward each other about the hub 26 to inclose the same and provide a bearing therefor. The extensions or lugs 20 and 23 therefore comprise bearings for the shaft 24. The pinion 25 meshes with the crown drive gear 15 and the latter when turned rotates the shaft 24. The lower end of the shaft 24 is provided with an exteriorly screw threaded portion 27 comprising means for interchangeably supporting a number of tools one at a time upon the shaft.

As shown in Fig. 1, a pan and boiler cleaner is disclosed, the same comprising a pair of disks 28 and 29 secured together by screws 30 or the like, and which engage the upper ends of a bunch of bristles, cords or other cleansing element. The upper plate 28 is provided at its central portion with an upstanding internally threaded socket 31 adapted to receive the lower threaded end 27 of the drive shaft. When this disk cleaner is employed the same is supported against the bottom of the pan or boiler and the device operated to rotate the disk whereupon the bunch of bristles are moved in the desired direction for loosening the dirt and cleansing and polishing the utensil.

In Fig. 4 there is shown a bottle cleaner or the like, the same comprising a stem 32 formed of a pair of wire strands twisted upon each other and between which the bunch of bristles 33 are secured. The bunch of bristles 33 is elongated and of cylindrical form, and the stem 32 preferably projects upwardly beyond the bunch of bristles 33 and is provided upon its upper end with an internally threaded socket 34 adapted to detachably engage upon the lower end of the shaft 24.

In Fig. 5 there is shown another type of tool which may be applied to the shaft 24. In this instance, the tool comprises a stem 35 having a head or enlarged portion 36 on its lower end and having an internally threaded socket 37 upon its upper end adapted for detachable engagement with the shaft 24. The stem 35 carries a plurality of outwardly bowed arms 28 formed of wire or the like which have their free end portions overturned to form eyes which receive the stem 35 therethrough. The opposite ends of the arms 38 engage respectively against the head 36 and the socket 37 to hold the arms in outwardly bowed relation with respect to the stem 35.

In use, the device is held in one hand by means of the handle 12 when the tool or instrument attached to the shaft 24 is applied to a relatively shallow receptacle, such as when beating eggs and when cleansing the bottom of pans and the like. When, however, the device is inserted in a bottle or a jar, the upper edge portion of the bottle or jar registers with the horizontal plane of the thumb loop 21 and the hand may be released from the handle 12 and grasped about the upper edge portion of the bottle or jar with the thumb extended through the loop 21. When in this position the frame of the device may be clamped firmly with the hand against the side of the bottle or jar and the device thus held securely in position. The handle 16 may now be turned, as far as is permissible without striking the top of the jar, or may be given a complete turn when the jar neck is slightly below the pinion 25. In this latter instance the hand may be stretched sufficiently for binding the frame against the jar or bottle. It is of course understood that at any time during the use of the device the hand may be engaged with the arched portion 17 with the finger or the thumb passing through the loop 21 so that a firm hold may be had upon the frame.

It is of course understood that various changes and modifications may be made in the details of construction and design of the above specifically described parts of the invention without departing from the spirit thereof, such changes and modifications being restricted only by the scope of the following claims.

I claim:—

1. In a kitchen utensil the combination of a metallic strip offset at its lower end and turned inwardly to form a bearing, said strip having its intermediate offset portion stamped to provide a pair of tongues, one of said tongues being arranged above the laterally turned lower extremity of the strip and the other tongue being rolled over against the inner side of the strip to provide a finger loop, a shaft journaled in said tongue on the lower portion of the strip, and a drive wheel pivotally mounted upon the upper end of the strip and having connection with said shaft to rotate the same.

2. In a kitchen utensil, the combination of a single length strip offset at one end and being inturned thereat to provide a bearing lug, said strip being stamped to provide a pair of tongues inwardly of the inturned end, one of said tongues being apertured to form a second bearing, the other tongue being rolled over against the inner side of the strip to provide a finger loop, a shaft journaled in said bearing tongue and said inturned end of the strip, a pinion on the upper end of the shaft, a crown gear mounted upon the upper end of the strip and meshing with said pinion, a handle on said gear to turn the same, and a tool detachably mounted upon the lower end of the shaft.

3. In a kitchen utensil, the combination of an elongated single length flat strip, said strip being offset at its inner end and having an arched portion joining the offset part of the strip to the body portion thereof, the offset portion of the strip being stamped to provide a pair of lugs, one of said lugs being rolled inwardly to provide a finger loop within the arched portion and the opposite lug being recessed in its outer end and having its extremities bent inwardly toward each other to form a closed bearing, the inner extremity of said strip being turned inwardly to form a second bearing, a shaft journaled in said bearings, a pinion on the upper end of the shaft, a crown gear pivoted to the body portion of the strip and meshing with said pinion, a handle mounted on the crown gear to turn the shaft, a plurality of tools interchangeably connected at the lower end of the shaft, and a handle secured to the upper end of the strip and projecting laterally therefrom and from the crown gear.

4. In a kitchen utensil, the combination of an elongated single length flat strip being offset at its inner end and having an arched portion joining the offset part of the strip to the body thereof, said offset portion being stamped to form a right angularly extending lug being recessed at the outer end and having its extremities bent inwardly toward each other to form a closed bearing, the inner extremity of said strip being turned inwardly to form a second bearing, a shaft journaled in said bearings, means for rotating said shaft, said shaft having its lower end threaded for detachable connection with a tool.

5. In a kitchen utensil, the combination of an elongated single length flat strip being offset at its inner end and having an arched portion connecting the offset and body portions, a tongue struck from said offset portion and having its outer end recessed, the extremities of said tongue being bent inwardly toward each other to form a closed bearing, the lower terminal of said offset portion bent to lie parallel with said tongue and to form a second bearing, a tool carrying shaft rotatably carried by said bearings, a second tongue struck from said offset portion and rolled to form a finger loop, a hand grip carried by the body portion and overhanging the offset portion.

6. In a kitchen utensil, an elongated single length flat strip being offset at its inner end, bearings carried by said offset portion, a finger loop carried by said offset portion near its upper end, and a hand grip carried by said body portion and overhanging said offset portion for co-action with said finger loop.

ABRAHAM C. PATTISON.